United States Patent [19]

Carlson

[11] 4,258,353
[45] Mar. 24, 1981

[54] VEHICLE ACCELERATION/DECELERATION WARNING SYSTEM

[76] Inventor: Robert W. Carlson, 410 Getzville Rd., Amherst, N.Y. 14226

[21] Appl. No.: 103,410

[22] Filed: Dec. 13, 1979

[51] Int. Cl.³ .................... B60Q 1/26; H01H 35/14
[52] U.S. Cl. .......................... 340/71; 340/72; 340/66; 200/61.45 R; 200/61.45 M; 250/200
[58] Field of Search ............. 340/71, 72, 52 H, 52 R, 340/52 F, 66, 69, 79, 81 R, 669; 200/61.45 R, 61.45 M, 61.83, 61.48, 61.52, 61.49; 250/200, 205

[56] References Cited

U.S. PATENT DOCUMENTS

| | | | |
|---|---|---|---|
| 2,734,105 | 2/1956 | Perry | 200/61.89 |
| 3,089,129 | 5/1963 | Nassikas et al. | 340/71 |
| 3,559,164 | 1/1971 | Bancroft et al. | 340/72 |
| 3,567,956 | 3/1971 | McNiel | 340/72 |
| 3,787,808 | 1/1974 | Knopf | 340/72 |
| 3,846,749 | 11/1974 | Curry | 340/72 |
| 4,107,647 | 8/1978 | Yoshino | 340/72 |

*Primary Examiner*—Thomas A. Robinson
*Assistant Examiner*—Donnie L. Crosland
*Attorney, Agent, or Firm*—Christel, Bean & Linihan

[57] ABSTRACT

A compound pendulum allows light to impinge upon properly positioned acceleration or deceleration photocells to vary the resistance of the photocells in accordance with the angular displacement of the pendulum; the amount and direction of angular displacement of the pendulum is dependent on the amount of acceleration or deceleration of the vehicle. Variation of the deceleration photocell resistance varies the frequency of an oscillator circuit to alternately flash a pair of warning lights at a frequency dependent on the rate of deceleration of the vehicle. The acceleration photocell must receive maximum illumination (a threshold value) to actuate a light for warning of a minimum rate of acceleration of the vehicle. A manual switch allows a high flash rate of alternate warning lights to be controlled by the operator of the vehicle. An audio generator produces a continuous tone for acceleration and an interrupted tone for deceleration, the frequency of interruption corresponding to the flash rate of the deceleration warning lights. The system is an aid in preventing rear end collisions and will save gasoline if properly used.

14 Claims, 5 Drawing Figures

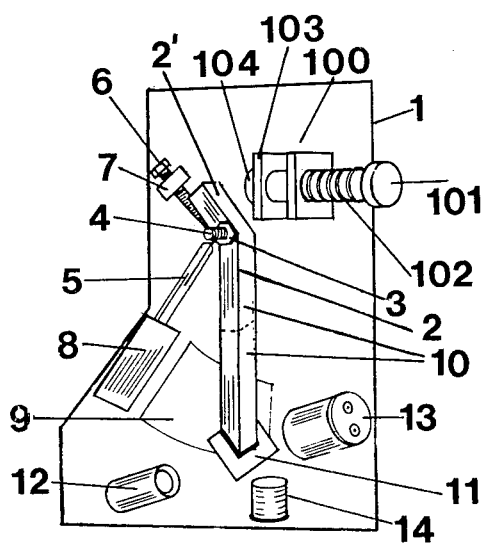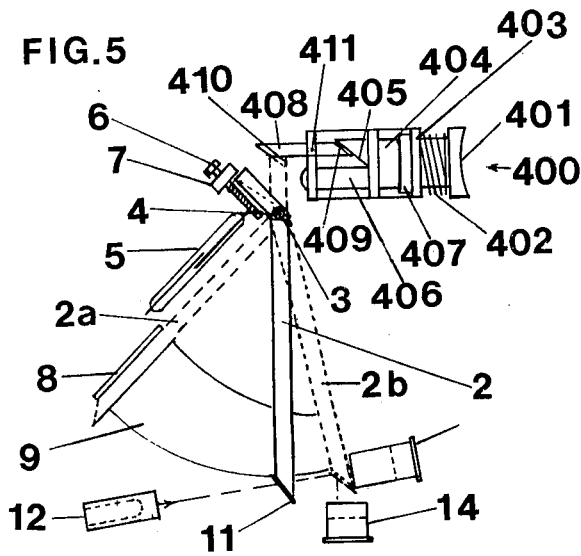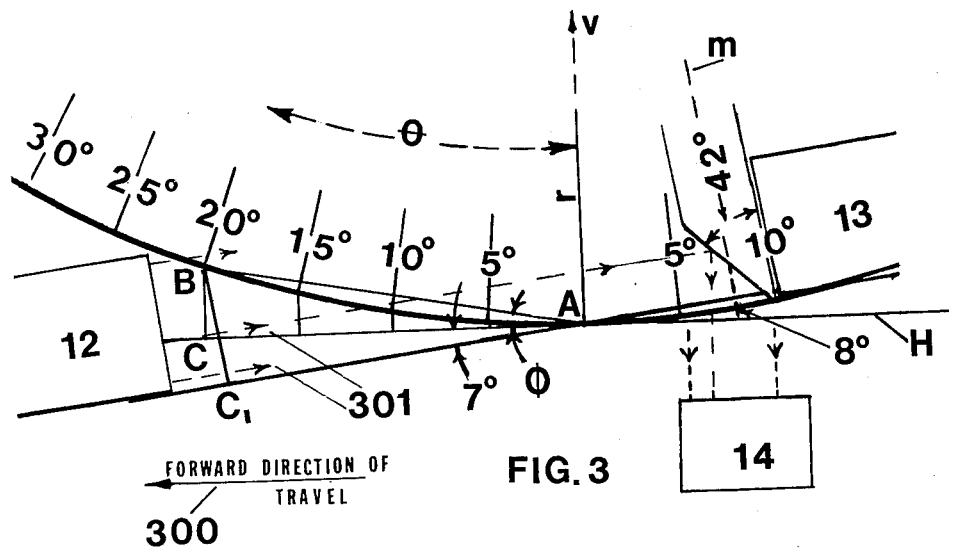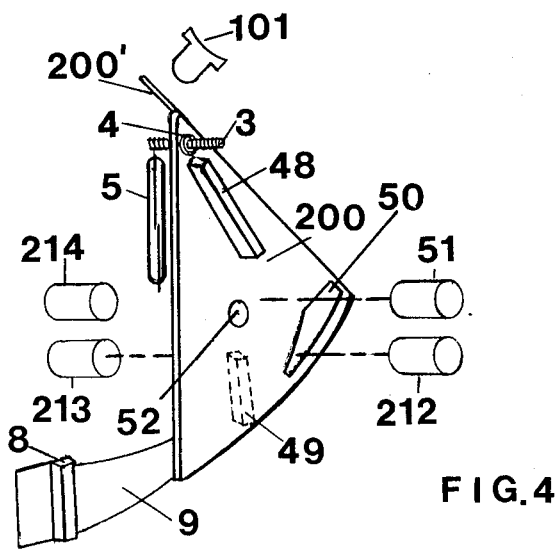

VEHICLE ACCELERATION/DECELERATION WARNING SYSTEM

LIST OF THE PRIOR ART

U.S. Pat. No. 4,107,647, Aug. 15, 1979—Yoshino
U.S. Pat. No. 3,567,956, Mar. 2, 1971—McNiel
U.S. Pat. No. 3,089,129, May 7, 1963—Nassikas et al.
U.S. Pat. No. 2,734,105, Feb. 7, 1956—Perry
U.S. Pat. No. 3,559,164, Jan. 26, 1971—Bancroft et al.
U.S. Pat. No. 3,787,808, Jan. 22, 1974—Knopf

DISCUSSION OF THE PRIOR ART

A review of the prior art in this field shows various schemes for sensing and displaying the state of deceleration of a vehicle. The various types of sensors used include: pendulums, spring loaded masses operating horizontally, mercury switches with single and multiple contacts, switches on brakes, pressure sensors and switches in hydraulic brake systems, manifold pressure sensors, sensors on moving shafts, change in drive power sensors, metallic balls on inclined resistive tracks, centrifugal switches, rotating magnets, various linkage systems on carburetor throttles and brake pedals, as well as combinations of these types of sensors.

Prior art displays include: simple flashing lights, momentary flashing brake lights, flashing of a single turn indicator, intensity variable lights, different colored lights, illuminating display panels, and high intensity flash and photoflash lamps.

Prior art means used for electrically actuating these displays are: thermal-type flashers of constant flash rates, flashers sensitive to thermal changes for variable rates, rotating magnets, carbon piles, potentiometers, step function RC electrical oscillators, and frequency and digital processing devices.

Sensors measuring pressure in brake systems can have gross errors depending upon the coefficient of friction between the brake linings (or pads) and the surface contacting these elements. Variations in driver habits and in these surfaces (when wear has started) are two other considerations. Presently used brake light display systems are simple on-off indicators the actuation of which required only a fraction of the maximum total pressure applied. Reliability is quite high, and these useful displays will probably continue to be used (in addition to any deceleration warning display).

Sensors taking information from rotating parts are not viable when the braking system has locked the wheels and subsequent drive shaft, thus giving a zero output when further deceleration of the vehicle is still taking place. Horizontal spring loaded masses can be affected adversely with temperature variations, changes in friction coefficients, wet or dry conditions, and mechanical mounting changes due to road shocks or the like.

Mercury switches, when sealed, afford an excellent means of switching. The housing of these switches requires an insulating material which is usually glass (since it is economical, easy to use, and the leads or contacts can be sealed) and requires special care in mounting. Mechanical shock can present a problem since the main body of the mercury can break up into small globules which can hang up on contacts or other irregularities in the housing.

All of the pendulums used in the devices of the prior art make use of switch contacts or potentiometers which are mechanical and are actuated by a short extension of the pendulum near the pivot point. A switch, in most cases, requires a firm solid contact and a wiping action to stay in faultless operation. A potentiometer also requires mechanical contact (with sometimes even greater friction than that needed for the switch wiping action) with the wire or composition of the resistive element. This mechanical loading requires that the pendulum be made long enough, with enough weight at the bottom end, to overcome this mechanical drag and still respond to changes. If the pendulum is shortened to meet a size requirement, more bottom-end weight will be needed. With a larger and heavier pendulum, the support and bearing at the pivot point must be made strong enough to support the pendulum and allow it to swing, while still restraining it from excessive side motion. The bar forming the length of the pendulum has to meet more rigorous mechanical requirements to accommodate this weight, thus presenting further problems. Mounting it in today's vehicle (where space is always at a premium) and supplying an appropriate bulk head, bracket, or brace in the vehicle to support and retain the assembly under road conditions is one such problem.

BRIEF SUMMARY OF THE INVENTION

This invention concerns an acceleration and deceleration warning device for motor vehicles. The device performs at least two very useful functions: (1) warning a trailing vehicle of deceleration in order to aid in the prevention of rear end collisions, and (2) warning the operator of the vehicle of possible bad habits in starting and stopping a vehicle, to thus allow the operator to improve these habits and save in gas, brakes, tires, and possible well being. This invention incorporates the use of an alternating flashing lights, the flash rate of these lights being proporational to the amount of deceleration of the vehicle. When a vehicle has stopped abruptly, or a collision has occurred, a high rate of flashing of the lights continues until the device is reset manually. Drivers of following vehicles are thereby alerted to slow down, stop, or take whatever action is required to prevent an accident (or to become part of an existing accident). This device can be set to reasonable threshold levels for deceleration and accelerations. If these threshold levels are exceeded, a pair of lights within sight of the driver will flash at a rate proportional to the amount of deceleration that is experienced and in unison with a pair of warning lights on the outside rear of the vehicle. An audible generator is also incorporated into the device, such that the tone is interrupted or beeped at the rate of flash of one of the alternating, flashing lights. This indicates to the driver that the vehicle deceleration was too fast and more braking was required than was necessary. With practice in the use of the device, the driver of the vehicle should be able to realize a savings in the wasted gasoline and wear and tear on the brake surfaces, by gradually applying the brakes for an anticipated stop.

When the driver exceeds the threshold of accereleration, a light and tone in continuous manner will be activated as an indication that, except in a case of emergency, fuel has been wasted on an amount of acceleration that is not necessary. A conscientious driver will, after some experience, improve his or her driving habits.

When the vehicle becomes stalled or immobile, a manual switch can be used to activate the flashing lights to alert oncoming vehicle drivers of the danger.

The alternating flashing lights on the rear of the vehicle should be placed within the upper ¼ of the overall height of the vehicle, making them visible to the immediate trailing vehicle as well as other trailing vehicles. The lights should also be spaced horizontally as far apart as possible, with the spacing between the lights standardized for all vehicles; this standardized spacing would allow drivers of trailing vehicles to develop a sense of distance from the flashing lights.

This device will operate in any road vehicle and measures only the rate of positive or negative acceleration. A heavily loaded truck will require a much longer braking distance than a passenger vehicle, as well as more time to accelerate in a positive direction; the device can still be used on these heavy vehicles and will measure the acceleration the same as it would on a light, compact, vehicle experiencing the same amount of acceleration. Acceleration is defined as a time ratio of change of velocity and is irrespective of the size and weight of the vehicle or other object. This device is an improvement in vehicle safety and does not replace brake lights. Brake lights are only an indication that the brakes have been applied; this device operates independently of the brakes, except that it measures the effect of the brakes when they are applied. When a prudent driver of a vehicle using this device slows down or comes to a stop, the brake lights will go on, but the warning system will not be activated. Only when the deceleration or acceleration limits are exceeded will the system indicate a response with the warning lights; that response is completely automatic and not part of any other system of the vehicle except the electrical system which supplies power to the warning device.

The pendulum used in the instant invention is quite small, 42 millimeters (mm) or approximately 1.7 inches, in length from the pivot point to the bottom end. This pendulum is not required to do any mechanical work except to move in accordance with changes in vehicle velocity. Prototype pendulums have been fabricated from small rigid tubes or channel sections of brass in the order of 4 mm. square. Two permanent magnets are placed, with poles aiding, within the channel sections. These magnets are approximately 0.125 inches square and 0.755 inches long (thus, allowing a snug fit into the pendulum section), and are fastened permanently into the section. Each magnet weighs approximately 1.5 grams, or a total of 3 grams for the pair of magnets, with the entire assembled pendulum weighing a total of 4 grams. The greatest mass obviously is in the magnets, the weight being distributed over the entire length of the pendulum; and the center of gravity of the completed pendulum is approximately 20 mm below the point of suspension. The completed pendulum unit, being light of weight, is quite easy to handle mechanically from the standpoint of suspension of the mass during deceleration or acceleration. The means of suspension is rather simple and novel. It makes use of a common machine screw (2–56) as the fixed suspension point, and two like-sized nuts are threaded onto the screw on either side of the pendulum. The pendulum then swings on the threads of the screw. A dry lubricant on these threads allows a very free swinging pendulum and provides and exceptionally free, smooth suspension system (with built-in side restraint offered by the spaced nuts threaded on either side). This suspension feature is also useful and economical in assembling the unit, since it can be adjusted toward or away from a back mounting plate by the nut and screw arrangement. The threaded screw pivot works well as a bearing for the pendulum and provides lateral stability, all in an economical way and with easy assembly and adjustment.

This pendulum and associated support base, in production quantities, permits injection molding techniques in which the threaded portion could be molded to the pendulum; molding materials offering excellent strength and low friction characteristics are readily available. The magnets contained within the pendulum section perform three functions. In the order of use, these functions are: (1) to provide damping on pendulum movement by exerting a magneto-motive force (mmf) between the pendulum and a shaped, soft steel, thin plate mounted on the back support and parallel to the plane in which the pendulum swings: (2) to close a reed relay switch (which sets the threshold for the low deceleration value) at a predetermined number of degrees from vertical; and (3) to lock the pendulum to a stop when it has exceeded the high limit of deceleration, as might occur in an emergency stop or crash. This allows warning indicators to continue in operation until the vehicle is in a safe position and a manual reset button is actuated. This reset push button operates against a canted section of the pendulum, extending upward from the suspension point at an angle of 45° and allows release of the pendulum after deceleration has been high enough in value to swing the pendulum an angle of 45° into contact with a stop plate. The opposite end (bottom) of the pendulum is also functional, having a reflective surface at an angle to the pendulum section for reflection of light from a light source onto a photocell when a predetermined amount of acceleration has taken place.

Prototypes of the entire system have been built and packaged on a single-sided printed circuit card of 3½ inches by 4 inches with a thickness, including the projection of all parts from the card, of less than one inch. This total package of 14 cubic inches, without a protective cover, weighs less than 4 ounces. The light weight and size of the package allows ease of mounting to a dash board and requires a small amount of space. A reset push button and small warning lights (corresponding to the warning lights on the outside of the vehicle) are mounted on the front panel of the unit within easy access and view of the operator of the vehicle. Various adjustable bracket mounting means could be utilized to ensure proper positioning of the unit.

BRIEF DESCRIPTION OF THE DRAWINGS

FIG. 2 is a prospective view of the pendulum assembly.

FIG. 3 schematically illustrates the angular relationships between the pendulum, light source, and photocells of one embodiment of the invention.

FIG. 4 is a perspective view of an alternate embodiment of the pendulum assembly of the invention.

FIG. 5 discloses an alternate embodiment of the push button reset assembly for the pendulum assembly.

DETAILED DESCRIPTION OF THE DRAWINGS

Figure 1:
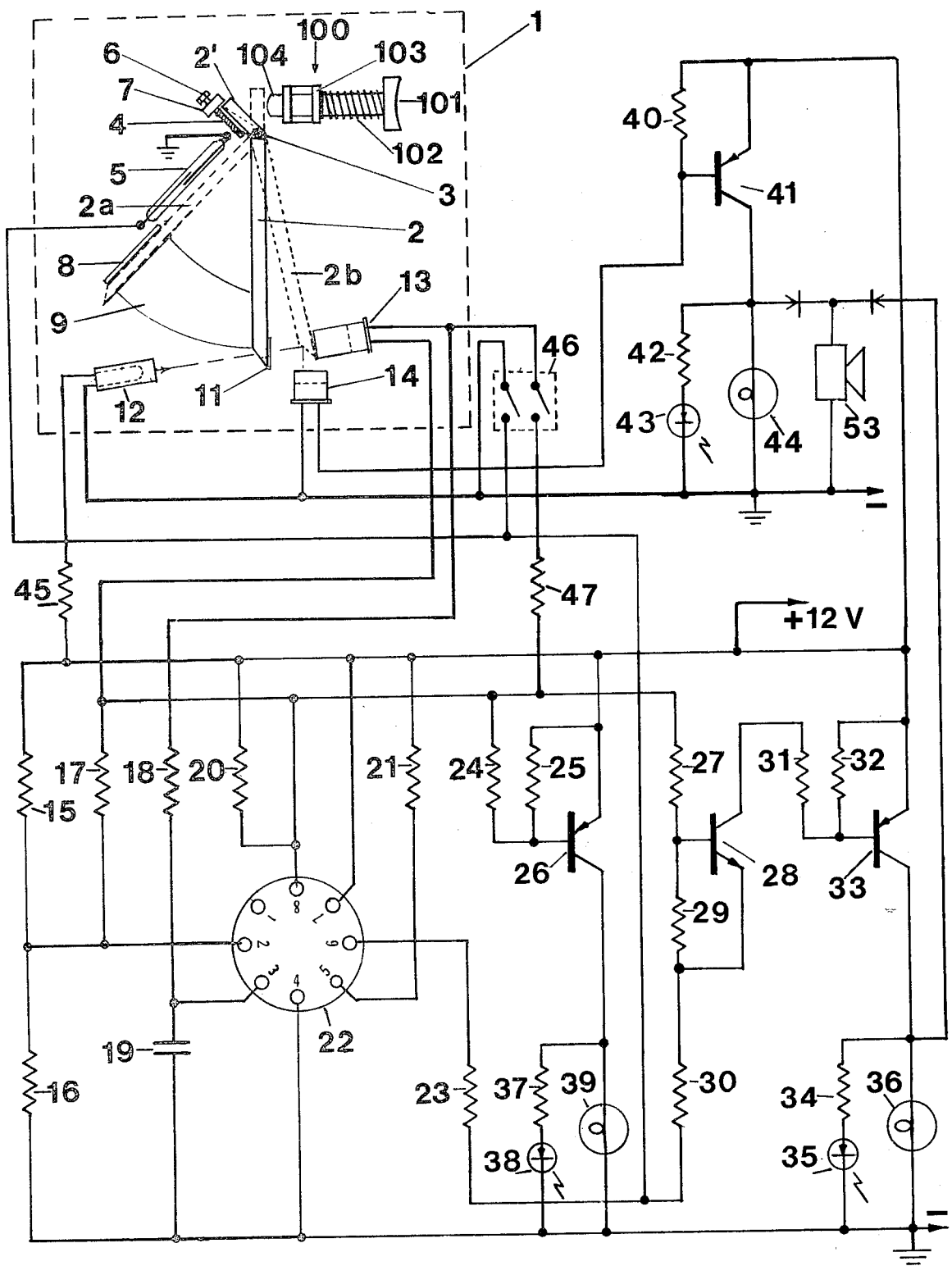
FIG. 1 is a schematic of the warning circuit.

Referring to FIG. 2, a mounting base 1 may be molded plastic, or the like material, for production quantities; a piece of glass phenolic board was used for the prototype. Mounted in fixed positions on base 1 are: push button bracket 103, nut 7, threaded support rod 4, reed switch 5, stop plate 8, damping plate 9, light source 12, and photocells 13 and 14. The mounting means for these various parts (i.e., push-button bracket 103) may be molded as a part of mounting base 1 during manufacture thereof.

Threaded rod 4 is the pivotal suspension support for a pendulum 2. Rod 4, as well as nuts 3 on each side of pendulum 2, are composed of a magnetic material; thus providing magnetic damping for the pendulum and part of a magnetic path (which also includes screw 6) to reed switch 5. Screw 6, of magnetic material, is for adjustment of the coupling of the magnetic field of pendulum magnet(s) 10 to thereby set the closing or deceleration threshold of reed switch 5. Closing of reed switch 5 completes the ground to the emitter of an oscillator circuit driver, thus allowing variation of the oscillator frequency (nominally 0.25 Hz–5.0 Hz) in proportion to the amount of illumination of photocell 13, for deceleration levels greater than the deceleration threshold level. By using screw 6, the tolerances of reed switch 5 and the pendulum magnet(s) 10 may be loose (as much as plus or minus 30%) to allow for manufacturing economy. Angular displacement of pendulum 2 (left-ward as seen in FIG. 1) actuates the closing of reed switch 5 by the magnet(s) 10 which are disposed within the pendulum 2. Mechanical stop plate 8 is displaced at a left-ward angular displacement of 45° from the vertical position of pendulum 2. Stop 8 is made of a high permeability soft magnetic material; when the pendulum reaches an angular displacement of over 30° (representing a deceleration of 16.1 feet per second, per second or 0.5 "g"), the magnet(s) 10 located in pendulum 2 pull the pendulum to the stop 8 and hold it in this position until it is released by a manual reset push-button assembly 100. With the pendulum held against stop 8, reed switch 5 is held closed with an even greater magnetic force to thereby prevent any mechanical shock experienced by the automobile from opening the contacts. Damping plate 9 is a flat strip of magnetic material, with high permeability and low retentivity, for providing mechanical damping to pendulum 2 which pivots in close proximity to damping plate 9; this is due to the magnetic field created by the permanent magnet(s) 10 located within pendulum 2. As can be seen from the figures, the damping action is increased as the left-ward angular displacement of pendulum 2 increases; a small magnetic path also is provided by damping plate 9 for activating reed switch 5. The left end of damping plate 9 is physically separated from stop 8, thus allowing the magnetic force to be increased slightly when the pendulum is held at stop member 8. Push-button assembly 100 includes button 101 attached to plastic rod 104 and inserted into a plastic or non-magnetic bracket 103. A spring 102 urges plastic rod 104 to a retracted position (to the right in FIG. 1), such that a canted extension 2' of pendulum 2 almost engages rod 104 when the pendulum 2 is held against stop 8 as indicated by the phantom line position 2a of FIG. 1. By depressing button 101, plastic rod 104 is urged into contact with extension 2' of pendulum 2 to disengage pendulum 2 from stop 8; spring 102 returns rod 104 to the position of FIG. 1. Located at the bottom end of pendulum 2 is a flat plate or section 11 surfaced at the proper angle of 42' (as best seen in FIG. 3. The outer surface of plate 11 is reflective to a light source 12 (7° below horizontal) and is dimensioned and positioned to reflect the light from light source 12 in a manner to be described. Light source 12 may be an LED which emits a red beam of light. Any radiant source of energy could be used with compatible light sensors. In this embodiment, photocells 13 and 14 are arranged as shown in the figures. The electrical resistances of these photocells 13 and 14 is high when they are not illuminated; the resistance value of each is decreased with an increase of illumination up to a saturation point. As can be seen from the figures, the illumination of photocell 13 varies as the left-ward angular displacement of pendulum 2 varies from approximately 8° to 22½° (the 8° value is the deceleration threshold). Left-ward angular displacement of pendulum 2 occurs during deceleration, with right-ward angular displacement of pendulum 2 occuring during acceleration the amount of angular displacement is proportional to the amount of deceleration or acceleration. Photocell 14 is for sensing a threshold value of acceleration. Photocell 14 is fully illuminated after a very small right-ward angular displacement of the pendulum and will remain fully illuminated as long as the acceleration is a minimum value equivalent to 8° of right-ward angular displacement of pendulum 2. This 8° pendulum swing represents an initial value of acceleration of approximately 4.5 feet per second, per second.

FIG. 1 also discloses the circuitry necessary for actuation of the various warning signals. Integrated circuit (IC) 22 contains a variable oscillator and subsequent driver; this is an integrated circuit used commonly in the industry and classified as CA3094. IC 22 is a differential input power control amplifier, consisting of a pair of operational amplifiers coupled to an internal Darlington coupled power transistor capable of supplying a driving current of up to 100 milliamps. FIG. 1 discloses a top view of the pin connections of IC 22. Pins 2 and 3 are the inputs to the operational amplifiers. Pin 8 is the collector output of the power amplifier (resistor 20 is the load resistor connected between pin 8 and B+) and drives subsequent transistors 26 and 28, the output of pin 8 being a square wave. Pin 6 of IC 22 is the emitter of the driver and is returned to ground through resistor 23 when reed switch 5 is closed or when double-pole, single-throw switch 46 is closed, resistor 23 removes the ground return for the amplifier when the pendulum 2 is in a vertical, i.e. rest, position. Resistor 45 is a current limiting resistor for light source 12. Resistors 15, 16 and 17 fix the bias of one of the internal amplifiers of IC 22, with resistor 17 selected to adjust the symmetry of the square wave oscillator output. Resistor 18, in series with the variable resistance of photocell 13, forms the RC time constant for the oscillator in conjunction with capacitor 19. Resistor 21, connected between pin 5 of IC 22 and B+, controls the gain of the differential amplifiers, and is selected to make the input impedance of the differential amplifiers high. Transistors 26 and 33 are PNP power transistors for driving respective warning lights 39,36. These power transistors are rated at 7 amps of continuous collector current to allow generous derating for warning lights 39, 36, which are of the type generally used as vehicle rear indicators. A medium power NPN transistor 28 operates as a phase inverter such that transistor 33 is "on" when transistor 26 is "off", and vice versa, according to the square wave frequency. For respective transistor 26, 28, and 33, resistors 25, 29, and 32 are base-emitter biasing resistors, and resistors 24, 27, and 31 are drive/isolation resistors. Resistors 47 is shunted across photocell 13 when manual switch 46 is closed; the value of resistor 47 is substantially equal to the maximum illumination resistance value of photocell 13. Thus, by closing switch 46, warning indicators 39, 36 are alternately flashed at a high rate (as in maximum deceleration); this provides for a trouble light arrangement much like that normally provided on automobiles, except that the warning lights of the instant invention are alternated. A PNP-type power transistor 41 is biased on when the minimum threshold of acceleration has been reached, such that maximum illumination reaches photocell 14 to lower the resistance value thereof. The resistance value of photocell 14, together with resistor 40, forms a voltage divider network to establish biasing voltage of transistor 41. Transistor 41 is used to drive acceleration indicator 44 located on the exterior of the vehicle. Audio generator 53 is driven by transistor 41 to provide a constant tone during acceleration; transistor 33 drives audio generator 53 during deceleration to provide an interrupted tone. Shunted across indicators 39, 36 and 44 are respective tell-tale lights (such as LEDS) 38, 35 and 43 located within view of the operator of the vehicle.

FIG. 3 discloses the angular relationship between pendulum 2, light source 12, and photocells 13 and 14. The tip of pendulum 2 describes an arc as shown. Reference line V indicates a vertical, and reference line H represents a horizontal tangent to the arc at the point of intersection with reference line V. The arc has degree markings increasing left-ward and right-ward from the vertical reference line V for ease of understanding the invention. The right-hand side of pendulum 2 (as seen in FIG. 2) lies along reference line V when the pendulum is at rest and in the vertical position. Pendulum 2 is limited in right-ward angular displacement by abutment with photocell 13 and in left-ward displacement by stop plate 8. Reference line M indicates the major axes of pendulum 2; this major axes M crosses the 8 degree mark on the arc when the pendulum has been displaced by 10 degrees right-ward, (at which time pendulum 2 abuts photocell 13). In the deceleration mode, the trailing edge of the pendulum is defining the aperture. As can be seen from the figure, this 10 degree swing of pendulum 2 provides maximum illumination of photocell 14 by the reflected light from light source 12. Maximum illumination of photocell 14 is the threshold value of acceleration warning. Of course, any greater acceleration, causing pendulum 2 to continue to abut photocell 13, continues to give maximum illumination to photocell 14. The direction of travel of the vehicle on which the instant invention is mounted is indicated by arrow 300. As can be seen from figure 3, increased deceleration of the vehicle causes increased left-ward displacement of pendulum 2 thus allowing more light (indicated generally at 301) from light source 12 to impinge upon photocell 13; this variation in the amount of light reaching photocell 13 ranges from no light reaching photocell 13 for any right-ward swing of pendulum 2 from vertical, to maximum illumination of photocell 13 during any left-ward angular displacement of pendulum 2 which is greater than approximately 22.5 degrees. Therefore, the height of a light aperture is defined by a perpendicular from the point on the arc at which the tip is located. For instance, when the tip of pendulum 2 is at 20° the height of the aperture is indicated as line $BC_1$. The height of the aperture is a direct function of $\theta$ which, in turn, is a function of the linear acceleration of the vehicle.

As previously stated, the amount of light impinging upon photocell 13 from light source 12 varies the resistance of photocell 13 to thus influence the frequency of the oscillator circuit and vary the rate of flashing of alternate deceleration warning signals 39, 36. In the acceleration mode, no acceleration indication is given until the pendulum has been displaced right-ward by an amount of 10° or greater.

FIG. 3 shows the radiant energy beam displaced by 7 degrees from the horizontal. With this displacement the aperture height of the beam below the pendulum tip is equal to a line $BC_1$. Lines BC and $BC_1$ are drawn from the 20 degree displacement angle only for the sake of visual clarity. Line $BC_1$ from any position on the arc of the pendulum determines the aperture height and can be determined by the sin of angle $\theta$ plus 7 degrees for the added angle, and the aperture increasing with the displacement angle of the pendulum. The aperture formed by $BC_1$ is larger than an aperture formed by line BC, which would be formed if the radiant energy beam were in a horizontal plane, especially at small angles of displacement. The 7 degree angle was selected as a result of the following arbitrary limits and the selection of electronic components. The low limit or threshold of deceleration which will activate the warning lights were chosen to be four and one half feet per second, per second, which is equal to a g value of 0.14 and a pendulum displacement of 8 degrees. The maximum flash rate is reached when the deceleration reaches 12 feet per second, this represents a g value of 0.4 and a displacement angle of $22\frac{1}{2}$ degrees. Unrestrained objects in a vehicle including the occupants on seats, will start to slide or move forward with a deceleration level of 0.5 gs. So to insure more safety the high limit of deceleration was set at 0.4 gs to be below the 0.5 g level. These arbitrary limits resulted in an aperture height determined by BC at the 8 degree displacement position which, was too small to properly activate sensor 13. The energy source is a L E D with a limited amount of light. Displacing the energy beam by 7 degrees provide an aperture formed by $BC_1$ of acceptable size. In fact, the aperture of 8 degrees, i.e. line $BC_1$, is 2.73 times higher than the length of B C. At a pendulum displacement angle of $22\frac{1}{2}$ degrees the ratio of $B C_1$ over B C is 1.6, which gives an aperture ratio from 8 to $22\frac{1}{2}$ degrees of approximately 4.6, which is suitable in this case, for a cadmium selenide sensor, packaged in a standard TO-5 semiconductor can. The 7 degree angle dictates that the reflective surface at the tip of the pendulum is set at 42 degrees with respect to the axis of the pendulum. This provides maximum illumination on sensor 14 when the sensitive surface of the sensor is parallel to H and the pendulum is in the extreme right position representing the threshold of the acceleration mode.

FIG. 4 illustrates an alternate embodiment in which a flat sector type pendulum 200 is used; the parts of the alternate embodiment that are the same as those of FIG. 2 have like reference numerals. Light source 212 and photocell 213 correspond to light source 12 and photocell 13 of FIG. 2 for indication of deceleration. Photocell 214 corresponds to photocell 14 of FIG. 2; however, the light source for this photocell 214 is indicated by light source 51. The flat sector type pendulum 200 has apertures 52 and 50 therein and permanent magnets 48 and 49 mounted thereon. Permanent magnets 48 and 49 are used in much the same manner as magnets 300 of FIG. 2. For instance, permanent magnet 48 is used to actuate reed switch 5, and permanent magnet 49 is used for mechanical damping of pendulum 200 as well as for a means of attracting and holding the pendulum 200 to stop 8 when the pendulum is displaced to approximately 40°.

In the deceleration mode, pendulum 200 swings leftward, and light source 212 is aligned with light source 213 through aperture 50 during a portion of the swing of pendulum 200. The amount of illumination reaching photocell 13 is controlled by the shape of aperture 50 such that a small amount of light reaches photocell 213 for an 8° left-ward angular displacement, the illumination gradually increasing with the size of aperture 50 up to approximately 22° at left-ward angular displacement. As can be seen from the shape of aperture 50, the amount of illumination reaching photocell 213 is constant from approximately 22° up to 45°, at which time there is no further left-ward angular displacement of pendulum 200.

During the acceleration mode, photocell 214 will be fully illuminated (to the threshold level for actuating the acceleration indicator) when pendulum 200 has been angularly displaced right-ward by approximately 8°, such that aperture 52 allows full illumination of photocell 214 by light source 51. A stop (not shown) prevents the pendulum 200 from swinging further than the acceleration threshold value of 8°, such that an acceleration that would cause a greater swing by the pendulum 200 continues to allow aperture 52 to be aligned so that maximum illumination is on photocell 214 from light source 51. The selection of the acceleration and deceleration values, resulting in specific angular location of the apertures, is not limited to these values and can be designed to meet any specific values.

FIG. 5 discloses an alternate embodiment of a push button reset assembly 400. Assembly 400 comprises a bracket 403 pivotally supporting a latch 408 on a pivot rod 411; a spring (not shown) is concentric upon rod 411 to bias latch 408 in the counterclockwise direction. Push button reset assembly 400 is shown in the relaxed position, in which position pendulum 2 is latched when it is in the phantom line position of 2a. The assembly 400 also includes a push button 401, a return spring 402, a collar 407 for abutting the bracket 403 to limit the return of push button 401 and a latch actuating rod 404. Rod 404 has an angled portion 405 to cooperate with angled portion 409 of latch 408. With pendulum 2 in the latched position as shown in the phantom line position of 2a, pushing of push button 401 against the bias of spring 402 causes slanted portion 405 to engage slanted portion 409 of latch 408, thereby causing latch 408 to rotate in a clockwise direction such that latch portion 410 is no longer in contact with canted extension 2' of pendulum 2. Further depression of push button 401 causes reset extension 406 of rod 404 to engage the canted portion of the pendulum 2 to release pendulum 2 from stop plate 8.

The operation of any simple inertial device used in a vehicle will be sensitive to any inclines (positive or negative) of the highway on which the vehicle travels. On most interstate highways and other modern roads, basically for safety reasons, the positive and negative grades (uphill and downhill) are limited to 5% in the mountainous areas, 3% in the rural country, and are substantially flat otherwise. Some 8° grades still exist, but these are rare. The grade, given in percent, means that the road rises or falls from a horizontal reference line over a given number of feet. For instance, if the road rises or falls 25 feet over a length of 500 feet, it will go up or down 5% in grade. The actual angle formed by this amount of rise would be 2.8°. The average angle on an 8° grade would be 4.5°. When using the device described in this application on a grade of 5%, a vehicle traveling at constant velocity will experience a pendulum bias of 2.8°.

When the vehicle is on a positive (5%, or 2.8°) grade, the pendulum will be biased backward toward the acceleration mode. With an additional 5.2° of pendulum displacement in that direction, the acceleration indicators would be actuated (for an 8° acceleration threshold). To actuate the deceleration indicators while traveling on this positive grade, a deceleration mode displacement of 10.8° would be necessary (when the deceleration threshold is set to 8°). When the vehicle is on a negative (5% of 2.8°) grade, the reverse action will take place and the pendulum will be biased 2.8° toward the deceleration mode. In both situations, the vehicle must be at a constant velocity as provided by cruise control. This type of control is not yet standard equipment on vehicles; a great many more vehicles are without it than are with it. Practically all drivers without cruise control unconsciously slow down when going uphill and unconsciously accelerate when going downhill. These two reactions tend to counteract the displacement of the pendulum and restore it toward the vertical. On the downhill side, the added acceleration may even go the other way and bias the pendulum in the opposite direction. When the pendulum going down a 5% grade has to decelerate rapidly (or stop), the warning indicators will be activated at a lower acceleration rate; since a 5% grade biases the pendulum to 2.8°, an additional displacement of 5.2° will activate the warning indicators. Therefore, a total displacement of 8° will occur with a deceleration of slightly less than 3 feet per second, per second. A following vehicle, due to this same grade, will take a longer distance to slow down or brake to a stop. The braking distance that is required increases on a negative grade and decreases on a positive grade, in proportion to the angle or rate of the incline. The instant invention provides a warning of deceleration which will alert the driver of the following vehicle and will provide additional time (and therefore distance) in which to accomplish a more rapid deceleration or stop. The reverse is also true for a positive grade, since the braking distance is less. The fact that the pendulum bias changes due to these grades does not detract from the system when operating with two or more cars. The effect is compensated for in the action of the vehicles as far as an operational safety device is concerned.

What is claimed is:

1. An electronic acceleration and deceleration warning system for a vehicle comprising:
    (a) a radiant energy source means for supplying radiant energy to first and second radiant energy sensor means, said first radiant energy sensor means having resistance which is variable in proportion to the amount of radiant energy received;
    (b) a pendulum adapted to control the amount of radiant energy received by said radiant energy sensor means from said radiant energy source means in response to angular displacement of said pendulum around a pivot point;
    (c) an oscillator circuit having a variable frequency output signal;
    (d) a deceleration threshold switch means for switching on the output signal of said oscillator circuit in response to a minimum angular displacement of said pendulum in one direction;
    (e) first and second alternately flashing deceleration warning lights having their rates of flashing dependent upon the frequency of said oscillator output signal when said oscillator output signal is switched on; and (f) an acceleration threshold switch means for turning on an acceleration warning signal in response to a minimum angular displacement of said pendulum in a second direction.

2. An apparatus as in claim 1, in which said pendulum includes:

(a) a reflector means, at an angle to the major axis of said pendulum, for reflecting all of said radiant energy away from said first sensor means over a first portion of the angular displacement of said pendulum and for controlling the amount of said radiant energy away to said first sensor means over a second portion of the angular displacement of said pendulum, whereby the amount of radiant energy received directly by said first sensor means is a function of the deceleration of the vehicle.

3. An apparatus as in claim 2, in which said second sensor means is disposed relative to said radiant energy source and to said pendulum to receive a threshold value of reflected radiant energy from said radiant energy source when said pendulum has swung to said minimum angular displacement in said second direction.

4. An apparatus as in claim 1, in which said pendulum includes a magnet means for actuating said deceleration threshold switch means.

5. An apparatus as in claim 1, in which said pendulum includes a magnet means cooperating with a damping means to retard the angular motion of said pendulum.

6. An apparatus as in claim 1, in which said deceleration threshold switch means is adjustable to vary the threshold value.

7. An apparatus as in claim 1, further comprising a stop means for said pendulum for stopping and retaining said pendulum at a particular deceleration displacement angle, said pendulum including a canted portion for cooperation with a reset means for release of said pendulum from said stop means.

8. An apparatus as in claim 1, further comprising an audio tone generator adapted to produce a continuous tone in conjunction with said acceleration warning signal and an intermittent tone in conjunction with one of said deceleration warning lights.

9. An apparatus as in claim 1, further comprising manual switch means for turning on said oscillator output signal at the discretion of the driver of the vehicle.

10. An apparatus as in claim 1, in which said first and second warning lights are spaced horizontally on the rear of said vehicle and operate in an alternate flashing manner, the rate of flashing being proportional to the deceleration of said vehicle.

11. An apparatus as in claim 1, in which a threaded screw serves as said pivot for said pendulum.

12. An apparatus as in claim 1, in which the position of said first sensor and said source is canted to obtain the optimum minimum illumination and the proper ratio of apertures.

13. Apparatus as in claim 1, wherein said first and second warning lights are operatively connected to indicating means within the vehicle to indicate the operation of said warning lights to the driver of the vehicle.

14. An apparatus as in claim 1, further including means for restraining the movement of said pendulum at a fixed point after said pendulum has reached a given angle of displacement.

* * * * *